United States Patent [19]
Woltman

[11] Patent Number: 5,014,647
[45] Date of Patent: May 14, 1991

[54] FISH CULTURE SYSTEM

[76] Inventor: Robert B. Woltman, 44625 Tonopah St., Newberry Springs, Calif. 92365

[21] Appl. No.: 170,822

[22] Filed: Mar. 21, 1988

[51] Int. Cl.[5] .............................................. A01K 63/04
[52] U.S. Cl. ................................................... 119/3
[58] Field of Search ............................ 119/2, 3, 4, 5

[56] References Cited

U.S. PATENT DOCUMENTS

| | | | |
|---|---|---|---|
| 3,773,014 | 11/1973 | Ewald, Jr. ................................ | 119/3 |
| 3,900,004 | 8/1975 | Goldman et al. ...................... | 119/3 |
| 4,052,960 | 10/1977 | Birkbeck et al. ...................... | 119/3 |
| 4,141,318 | 2/1979 | MacVane et al. ..................... | 119/3 |
| 4,144,840 | 3/1979 | Bubien .................................... | 119/3 |
| 4,159,009 | 6/1979 | Friedman ............................... | 119/3 |
| 4,399,769 | 8/1983 | Casey ...................................... | 119/3 |
| 4,414,919 | 11/1983 | Hess ........................................ | 119/5 X |

Primary Examiner—Robert W. Bahr
Attorney, Agent, or Firm—Quirk, Tratos & Roethel

[57] ABSTRACT

A fish culture system for cultivating fish contained in tank-like silos through which aerated water that may also contain food and/or medicine is circulated in such a way that the water circulates upwardly through the silos. Individual silos containing diseased fish may be isolated for treatment of the fish independently of the remaining fish population. Sediment collecting in the bottoms of the silos may be drained and dried for use as fertilizer.

7 Claims, 2 Drawing Sheets

FISH CULTURE SYSTEM

BACKGROUND OF THE INVENTION

1. Field of the Invention

This invention relates generally to the art of fish breeding or fish culture and more particularly to an improved fish culture system.

2. Prior Art

Large scale fish breeding for commercial purposes is carried out in a breeding system commonly referred to as a fish culture system. A typical fish culture system has a number of large water tanks called silos through which water is circulated and in which the fish are bred and raised. Oxygen, food and medicine are added to the water as necessary for optimum growth and health of the fish.

SUMMARY OF THE INVENTION

This invention provides an improved fish culture system of this class. According to one feature of the invention, water is circulated through each fish tank or silo by injecting water into the bottom of each silo and draining water from the top of the silo so that the incoming water flows or circulates upwardly through the silo from its bottom to its top. According to another feature of the invention, oxygen, food and medicine are introduced, as required, into the water entering each silo so that the oxygenated water, food, and/or medicine, as the case may be, circulate(s) upwardly through the silo.

A further feature of the invention is concerned with selectively isolating certain fish from the remainder of the fish population for one reason or another, such as diseased fish from healthy fish in order to treat the diseased fish and prevent spread of the disease to the healthy fish. According to this feature, each silo may be isolated from the remaining silos, thereby isolating the fish in the isolated silo from the other fish in the system.

Over a period of time, fish waste, food, and other matter collects in the bottom of the silos. According to a feature of this invention, this matter may be drained from each silo and dried to form fertilizer.

The presently preferred embodiment of the invention has a number of fish tanks or silos connected to a pump by piping through which water is withdrawn from the tops of the silos by gravity and then delivered by a pump (not shown) to the bottoms of the silos. Connected to this piping are means for selectively introducing oxygen, food, and medicine, as required, into the water flowing from the pump into the silos. Associated with each silo are valves for selectively isolating the silo from the water circulation piping and other means for recirculating water through that silo independently of the remainder of the system. In this way, fish which need special treatment, such as diseased fish, may be isolated and treated independently of the other fish. The bottoms of the silos are connected by valved drain lines to a drying facility, such as a drying pond, to which sediment collected in the bottoms of the silos may be drained for drying to form fertilizer.

DESCRIPTION OF THE PREFERRED EMBODIMENT

Figure 1:
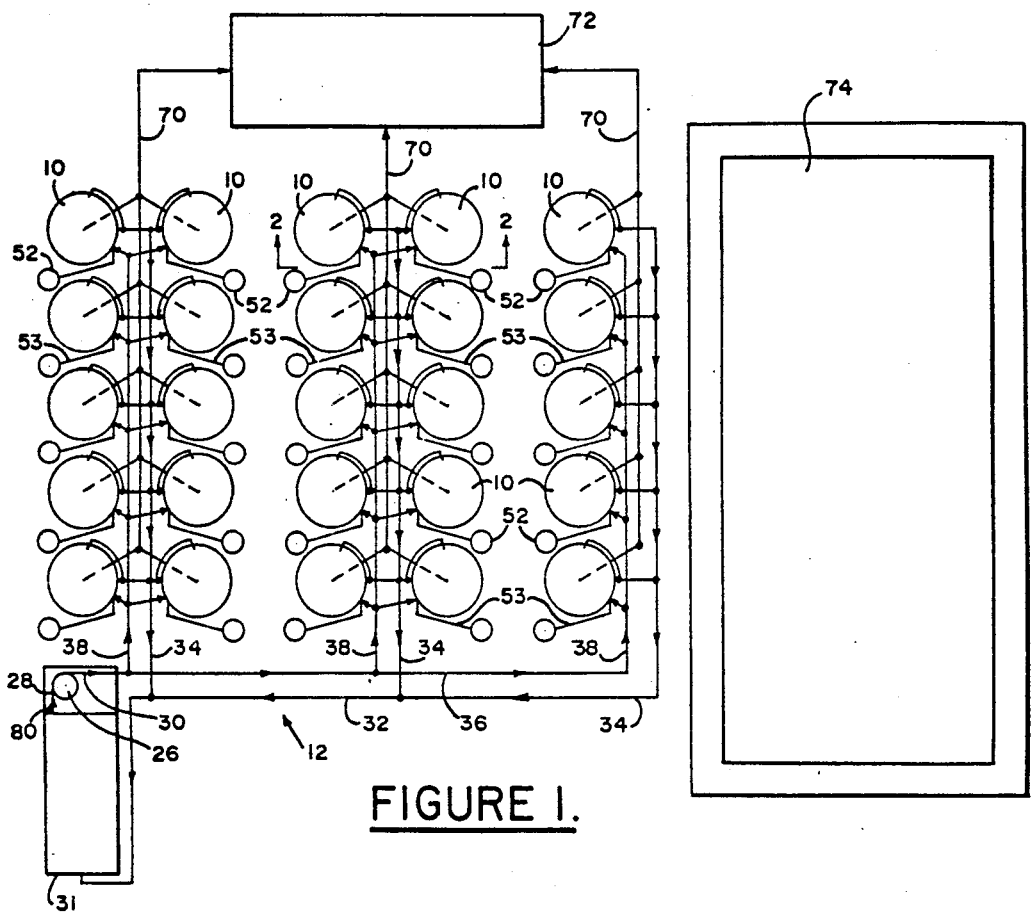
FIG. 1 diagrammatically illustrates a presently preferred fish culture system according to the invention.
Figure 2:
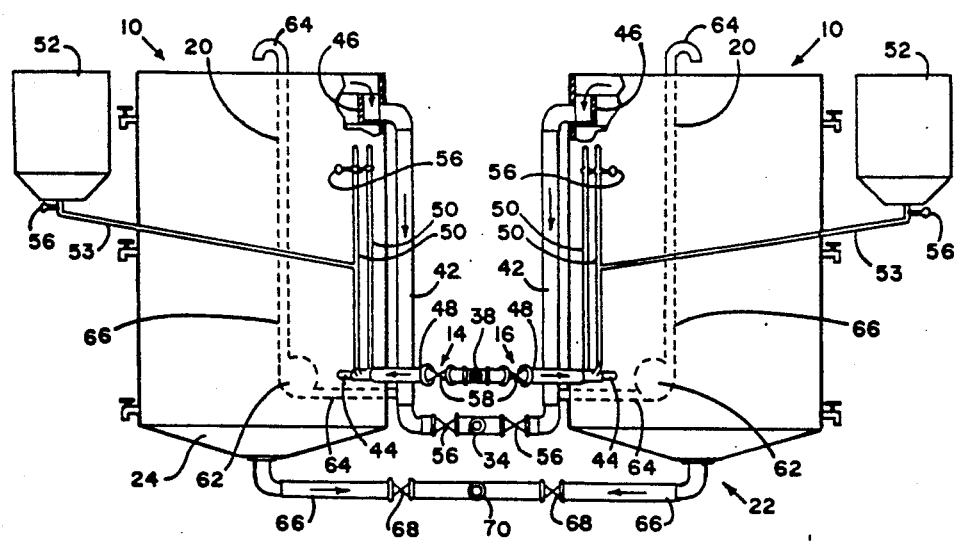
FIG. 2 is a vertical section through the system illustrating two fish culture silos and certain piping of the system.
Figure 3:
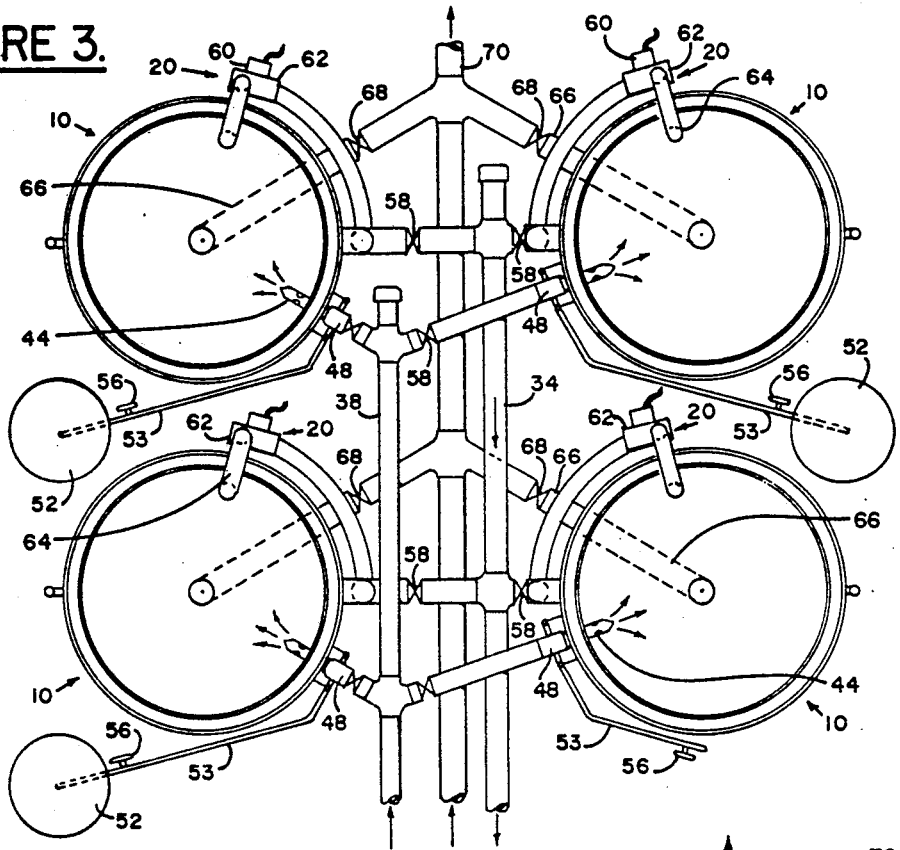
FIG. 3 is a fragmentary top plan view of the system.

Turning now to these drawings, the improved fish culture system of the invention comprises a plurality of fish tanks 10, or silos as they are commonly called. Water is circulated through these silos by water circulation means 12. According to one feature of the invention, this water circulation means circulates water through the silos 10 by injecting water into the bottoms of the silos and drawing water off from the tops of the silos. Accordingly, water circulates or flows upwardly through the silos.

Another feature of the invention resides in aspirator means 14 for introducing or aspirating into the water entering the silos 10 a substance comprising at least one of the following: oxygen, food, medicine. In the disclosed embodiment, for example, an aspirator is associated with each silo for aerating or oxygenating the water entering the silos.

Occasionally, it is desirable or absolutely essential to isolate the fish in one or more silos 10 from the remainder of the fish population. Isolation of diseased fish, for example, is necessary to prevent contamination of the healthy fish. To this end, the fish culture system of this invention embodies means 16 for selectively isolating each silo 10 from the remainder of the fish culture system. Associated with each silo are means 20 for recirculating water through the silo when it is thus isolated.

Over any extended period of time, fish waste, food, and other matter collects as sediment in the bottoms of the silos. This sediment must be periodically removed. To this end, the improved fish culture system of the invention embodies means 22 for draining the sediment from the silos. This sediment may be dried to form fish fertilizer.

Referring now in more detail to the illustrated, presently preferred embodiment of the invention, the fish silos 10 are relatively large tanks open at their tops. The bottoms of these tanks or silos are closed by slightly conically tapered bottom walls 24. In a typical fish culture system according to the invention, the silos 10 are arranged in rows, as illustrated, and may be twenty-five or more in number.

Figure 4:
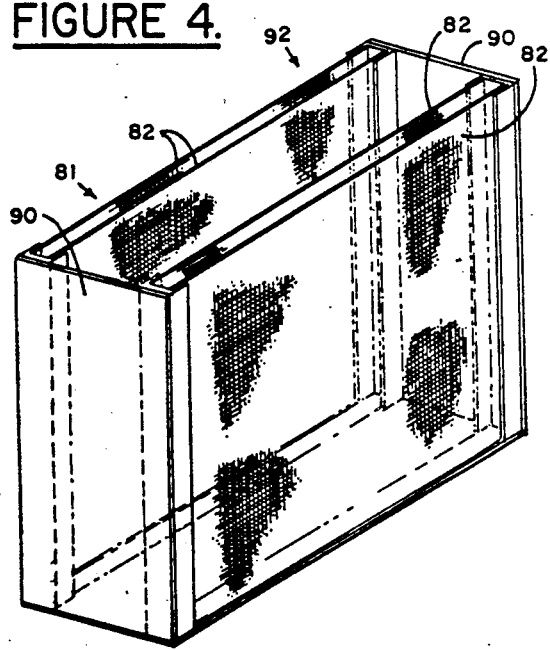
FIG. 4 is a perspective view of one section of a filter embodied in the fish culture system.
Figure 5:
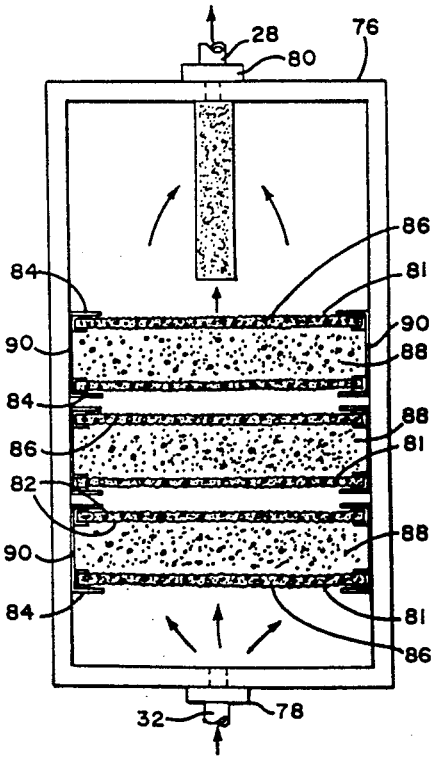
FIG. 5 is a section through the filter.

The water circulation means 12 of the fish culture system comprises a pump 26 having an intake 28 and a discharge 30. The pump intake 28 is connected through a filter 31 to a water return header pipe 32 from which extend a plurality of water return pipes 34 extending from the silos 10. Connected to the pump discharge 30 is a water supply header pipe 36 from which extend a plurality of water supply pipes 38 extending to the silos. While any efficient water filter may be used as the filter 31 in the fish culture system of the invention, the particular filter shown in FIGS. 4 and 5 is preferred and particularly suited for use in the system. This preferred filter will be described presently. Suffice it to say at this point that during operation of the pump 26, water flow occurs from the silos 10, through the filter 31, and then back to the silos.

The fish silos 10 are spaced along the return and supply pipes 34, 38. Each silo has an outlet 42 connected to the adjacent water return pipe 34 and an inlet 44 connected to the adjacent water supply pipe 38. From this description, it will be understood that water flow occurs from the pump 26 through the supply header pipe 36 and the supply pipes 38 to the silos 10 and from the silos through the water return pipes 34, return here, pipe 12 and filter 31 back to the pump 26. The water circulation means 12 is thus effective to circulate water through the silos 10.

According to an important feature of the invention, each silo inlet 44 opens to the bottom of its respective silo 10, and each silo outlet 42 opens to the top of its silo. The water circulation means 12 is thus effective to circulate water upwardly through each silo. Preferably, water flow from each silo 10 to its outlet 42 occurs from the water surface over a weir or skimmer 46.

As mentioned earlier, the fish culture system includes aspirator means 14 for aspirating into the water entering each silo 10 a substance comprising at least one of the following: oxygen, food, medicine. The particular aspirator means illustrated comprises an aspirator 48 connected between the inlet 44 of each silo 10 and the adjacent water supply pipe 38. The preferred aspirator is that described in my prior U.S. Pat. 4,308,138. This aspirator has a pair of suction inlets (not shown) opening to atmosphere through upstanding tubes 50. During operation of the water circulation means 12, the water entering the silos through the aspirators 48 produces a subatmospheric pressure in the aspirators, whereby air is drawn in through the aspirator tubes 50 to mix with the entering water. Aspirators 48 thus function as aerators for aerating or oxygenating the water entering the silos.

In addition to the aerators 48 the aspiration means 14 comprises a container 52 associated with each silo 10 for containing at least one of the following: food, medicine. The bottom of this container is connected by a tube 53 to one air inlet tube 50 of the aspirator or aerator 48 for the respective silos. Water flow through the aerators 48 thus aspirates the contents of the containers 52 into the water flowing into the silos. Valves 56 are provided for regulating flow of air and the contents of the containers 52 to the silos.

The isolation means 16 permit any selected silo or silos 10 to be isolated from the remainder of the fish culture system. To this end, the isolation means comprises shutoff valves 58 connected between the inlet and outlet of each silo and the respective water return and supply pipes 34, 38. These valves are left open during normal operation of the system. When it is desirable or necessary to isolate a silo from the rest of the system, its valves 58 are closed to isolate the silo from the water circulation means 12.

As mentioned earlier, there is associated with each silo 10 a means 20 for recirculating water through the silo when the latter is isolated from the remainder of the system by closure of its shutoff valves 58. This water recirculation means comprises a pump 60 having an intake 62 and a discharge 64. The pump intake 62 connects to the silo outlet 42. The pump discharge 64 is a long pipe which extends above the water level in the silo and opens downwardly toward the water surface. During operation of the recirculating pump 62 water is pumped from the silo outlet 42 to the top of the silo. Discharge of the water from the upper end of the pump discharge pipe aerates the water.

Over any extended operating period of the present fish culture system, waste from the fish, food and other matter collects as sediment in the bottoms of the silos 10. The sediment drainage means 22 permits periodic removal of this sediment. To this end, the drainage means comprises a drain outlet 66 from the bottom of each silo containing a shutoff valve 68. The silo drain outlets 66 connect to sediment drain pipes 70 extending to a facility 72, such as a drying pond or pit, for drying the sediment. The sediment, when thus dried, can be used for fertilizer.

The operation of the fish culture system is obvious from the foregoing description. The silos are filled with water and with the fish to be cultured or raised. These fish will have been obtained from a suitable source, such as a brood pond 74, in which the fish will have been bred and raised for a short period of time. During normal operation of the system, the water recirculation means 12 is operative to circulate water through the fish silos 10 in such a way that the water enters the bottom of each silo and then circulates upwardly through the silo. The water thus entering the bottom of and circulating upwardly through each silo is aerated by the aerator 48 for the silo and is effective to efficiently maintain the proper oxygen level in the water in the silo. The water entering each silo may also contain food and/or medicine which is introduced into the water from the respective container 52.

In the event it becomes necessary to isolate the fish in one or more of the silos 10 from the remaining fish population for one reason or another, such as to treat diseased fish in one silo, the shutoff valves 58 for that silo are closed and the water recirculation pump 62 for the silo is operated to recirculate water through the silo. Appropriate medicine may be introduced in any convenient way into the isolated tank along with food, as required. Periodically, sediment is drained from the silos to the drying facility 72.

As mentioned earlier, the filter 31 illustrated in FIGS. 4 and 5 is the preferred filter for use in the present fish culture system, although other filters may be used in the system. The illustrated preferred filter 31 comprises a housing 76 containing an inlet 78 through which water enters the housing from the water return header 32 and an outlet 80 connected to the intake 28 of pump 26. Extending across the interior of the housing 76 between the inlet and outlet are a number of pairs 81 of spaced screens 82. These screens are supported in brackets 84 fixed to the inner walls of the housing. Filling the inter-screen spaces of each pair 81 is a filter material 86, such as clinoptilolite, which is a gravel-like material. A filter material 88, such as activated carbon, fills intervening inter-screen spaces which alternate with the inter-screen spaces of the screen pairs 81. During operation of the system, water flow occurs through the filter and foreign matter in the water is filtered out. The filter may be periodically cleaned by removing the screens 82 and filter material 86, 88. The filter has a removable closure for this purpose. If desired, the brackets 84 for the adjacent screen pairs 81 may be rigidly joined by plates 90 to form, with the screens 82, filter modules 92 which are removable for cleaning.

The inventor claims:

1. In a fish culture system, the combination comprising:
    a plurality of fish culture silos,
    means for circulating water through said silos including a pump having an intake and a discharge, a water return pipe connected to said intake, a water supply pipe connected to said discharge, an outlet connecting the top of each silo to said return pipe, and an inlet connecting said supply pipe to the bottom of each silo, valves between each silo and said supply and return pipes, whereby each silo may be selectively isolated from said water circulating means, and means associated with each silo for recirculating water through each silo independently of said first mentioned water circulating means whereby water enters the bottom of each silo through the respective inlet, circulates upwardly through the silo, and emerges from the silo through the respective outlet.

2. The subject matter of claim 1, wherein:

said associated water recirculating means comprises an auxiliary pump having an intake and a discharge communicating to the respective silo.

3. The subject matter of claim 2, wherein:

the intake of each auxiliary pump connects to the outlet of the respective silo, and the discharge of each auxiliary pump opens to the respective silo.

4. In a fish culture system, the combination comprising:

a fish culture silo, means for circulating water through said silo by injecting water into the bottom of the silo and withdrawing water from the top of the silo, said means comprising a pump having an intake and a discharge, and piping connecting said intake to the top of said silo and said discharge to the bottom of said silo, said system further comprising means including an aspirator connected to said piping for aspirating into the water entering said silo a substance comprising at least one of the following: oxygen, food, medicine, said aspirating means comprising a container for containing at least one of the following: food, medicine, and said aspirator having an inlet connected to said container for aspirating the contents of said container into the water entering said silo.

5. The subject matter of claim 4, including:

an aspirator having an air inlet opening to atmosphere for aspirating air as well as the contents of said container into the water entering said silo.

6. In a fish culture system, the combination comprising:

a plurality of fish culture silos, means for circulating water through said silos including a pump having an intake and a discharge, a water return pipe connected to said intake, a water supply pipe connected to said discharge, an outlet connecting the top of each silo to said return pipe, and an inlet connecting said supply pipe to the bottom of each silo, means for introducing into the water entering said silos a substance comprising at least one of the following: oxygen, food, medicine, said introducing means comprising an aspirator for aspirating said substance into the water, said aspirator comprising a container associated with each silo for containing a substance comprising at least one of the following: food, medicine, and said aspirator connected to the inlet of each silo for aspirating the contents of the corresponding container into the water entering the silo, whereby water enters the bottom of each silo through the respective inlet, circulates upwardly through the silo, and emerges from the silo through the respective outlet.

7. In a fish culture system, the combination comprising:

a plurality of fish culture silos, means for circulating water through said silos including a pump having an intake and a discharge, a water return pipe connected to said intake, a water supply pipe connected to said discharge, an outlet at the top of each silo connected to said return pipe, and an inlet at the bottom of each silo connected to said supply pipe, whereby water enters the bottom of each silo through the respective inlet, circulates upwardly through the silo, and emerges from the top of each silo through the respective outlet, valves in said inlet and outlet for each silo, whereby each silo may be selectively isolated from said supply and return pipes, an auxiliary pump associated with each silo having an intake and an outlet communicating with the respective silo for recirculating water through the silo when the silo is isolated from said supply and return pipes, aspirators connected to said silo inlets and having suction openings opening to atmosphere for oxygenating the water entering each silo, a container associated with each silo for containing a substance comprising at least one of the following: food, medicine, and communicating with a suction opening of the corresponding aspirator for aspirating the contents of each container into the water entering the silo, and means for draining sediment from the bottoms of each silos.

* * * * *